United States Patent
Van Hove et al.

(10) Patent No.: US 12,233,589 B2
(45) Date of Patent: Feb. 25, 2025

(54) INTEGRALLY BLOW-MOULDED BAG-IN-CONTAINER HAVING A BAG ANCHORING POINT, PROCESS FOR THE PRODUCTION THEREOF, AND TOOL THEREOF

(71) Applicant: Anheuser-Busch InBev S.A., Brussels (BE)

(72) Inventors: Sarah Van Hove, Korbeek-Dijle (BE); Daniel Peirsman, Bornem (BE); Rudi Verpoorten, Steinhausen (CH)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 243 days.

(21) Appl. No.: 17/706,555

(22) Filed: Mar. 28, 2022

(65) Prior Publication Data
US 2022/0396022 A1   Dec. 15, 2022

Related U.S. Application Data

(60) Continuation of application No. 17/115,721, filed on Dec. 8, 2020, now abandoned, which is a continuation
(Continued)

(51) Int. Cl.
*B29C 49/22* (2006.01)
*B29C 49/48* (2006.01)
(Continued)

(52) U.S. Cl.
CPC .............. *B29C 49/22* (2013.01); *B29C 49/48* (2013.01); *B65D 25/16* (2013.01); *B65D 33/01* (2013.01);
(Continued)

(58) Field of Classification Search
CPC ......... B29C 49/22; B29C 49/48; B29C 49/12; B65D 33/01; B65D 83/0055; B65D 25/16;
(Continued)

(56) References Cited

U.S. PATENT DOCUMENTS 2,959,812 A  11/1960 Allen
3,050,773 A   8/1962 Hagen
(Continued)

FOREIGN PATENT DOCUMENTS

CN  102317051 A   1/2012
DE   2115269 A1  10/1972
(Continued)

OTHER PUBLICATIONS

I Hwa Lee, Bonding "Unjoinable" Polymers, DuPont Packaging & Industrial Polymers, 2011, packaging.dupont.com, 7 pages. Heiniken Ex. 1029.
(Continued)

*Primary Examiner* — Monica A Huson
(74) *Attorney, Agent, or Firm* — ARENTFOX SCHIFF LLP

(57) ABSTRACT

The invention is an integrally blow-moulded bag-in-container obtainable by blow-moulding an injection moulded multi-layer preform. The bag-in-container includes an inner layer forming the bag and an outer layer forming the container, and a single opening, the mouth, fluidly connecting the volume defined by the bag to the atmosphere. The container further includes at least one interface vent fluidly connecting the interface between inner and outer layers to the atmosphere, wherein the bag is anchored to the outer layer at at least one point remote from the single opening and
(Continued)

interface vent. The invention also relates to a process and a mould for the production of the blow-moulded bag-in-container.

15 Claims, 3 Drawing Sheets

Related U.S. Application Data of application No. 15/853,597, filed on Dec. 22, 2017, now Pat. No. 10,864,671, which is a division of application No. 14/552,343, filed on Nov. 24, 2014, now Pat. No. 9,849,621, which is a division of application No. 12/450,904, filed as application No. PCT/EP2008/054768 on Apr. 18, 2008, now Pat. No. 8,925,748.

(51) Int. Cl.
- B65D 25/16 (2006.01)
- B65D 33/01 (2006.01)
- B65D 83/00 (2006.01)
- B29C 49/12 (2006.01)
- B29K 67/00 (2006.01)
- B29K 105/00 (2006.01)
- B29L 31/00 (2006.01)
- B65D 1/02 (2006.01)

(52) U.S. Cl.
CPC .......... *B65D 83/0055* (2013.01); *B29C 49/12* (2013.01); *B29K 2067/003* (2013.01); *B29K 2105/258* (2013.01); *B29L 2031/712* (2013.01); *B65D 1/0215* (2013.01)

(58) Field of Classification Search
CPC ............ B65D 1/0215; B29K 2105/258; B29K 2067/003; B29L 2031/712
See application file for complete search history.

(56) References Cited

U.S. PATENT DOCUMENTS

| | | | |
|---|---|---|---|
| 3,285,461 A | 11/1966 | Santelli |
| 3,450,254 A | 6/1969 | Miles |
| 3,484,011 A | 12/1969 | Greenhalgh et al. |
| 3,491,918 A | 1/1970 | Lucas |
| 3,632,004 A | 1/1972 | Grimes et al. |
| 3,843,005 A | 10/1974 | Uhlig |
| 3,869,056 A | 3/1975 | Valyi |
| 3,878,282 A | 4/1975 | Bonis et al. |
| 3,932,104 A | 1/1976 | Schneider |
| 3,940,001 A | 2/1976 | Haefner et al. |
| 3,955,697 A | 5/1976 | Valyi |
| 4,013,748 A | 3/1977 | Valyi |
| 4,079,850 A | 3/1978 | Suzuki et al. |
| 4,092,391 A | 5/1978 | Valyi |
| 4,107,362 A | 8/1978 | Valyi |
| 4,147,278 A | 4/1979 | Uhlig |
| 4,170,623 A | 10/1979 | Dubois et al. |
| 4,233,010 A | 11/1980 | Suzuki |
| 4,243,725 A | 1/1981 | Wiggins et al. |
| 4,250,078 A | 2/1981 | McFarlane et al. |
| 4,273,246 A | 6/1981 | Thompson |
| 4,280,859 A | 7/1981 | Thompson |
| 4,330,066 A | 5/1982 | Berliner |
| 4,339,502 A | 7/1982 | Gerry et al. |
| 4,378,328 A | 3/1983 | Przytulla et al. |
| 4,381,277 A | 4/1983 | Nilsson |
| 4,408,004 A | 10/1983 | Pengilly |
| 4,417,753 A | 11/1983 | Bacehowski et al. |
| 4,454,945 A | 6/1984 | Jabarin et al. |
| 4,459,400 A | 7/1984 | Kuhfuss et al. |
| 4,476,272 A | 10/1984 | Pengilly |
| 4,510,115 A | 4/1985 | Gokcen et al. |
| 4,529,570 A | 7/1985 | Przytulla |
| 4,609,516 A | 9/1986 | Krishnakumar et al. |
| 4,646,925 A | 3/1987 | Nohara |
| 4,680,208 A | 7/1987 | Aoki et al. |
| 4,696,840 A | 9/1987 | McCullough et al. |
| 4,816,093 A | 3/1989 | Robbins, III |
| 4,818,575 A | 4/1989 | Hirata et al. |
| 4,847,129 A | 7/1989 | Collette et al. |
| 4,863,665 A | 9/1989 | Schad et al. |
| 4,865,224 A | 9/1989 | Streck |
| 4,865,234 A | 9/1989 | Folgero |
| 4,875,508 A | 10/1989 | Burke, II et al. |
| 4,892,230 A | 1/1990 | Lynn, Jr. |
| 4,933,135 A | 6/1990 | Horwege et al. |
| 4,984,713 A | 1/1991 | Chambers et al. |
| 5,012,944 A | 5/1991 | Scheurenbrand et al. |
| 5,012,956 A | 5/1991 | Stoody |
| 5,069,363 A | 12/1991 | Daimler |
| 5,197,602 A | 3/1993 | Biesecker et al. |
| 5,219,005 A | 6/1993 | Stoffel |
| 5,242,085 A | 9/1993 | Richter et al. |
| 5,301,838 A | 4/1994 | Schmidt et al. |
| 5,332,121 A | 7/1994 | Schmidt et al. |
| 5,344,045 A | 9/1994 | Richter et al. |
| 5,368,195 A | 11/1994 | Pleet et al. |
| 5,381,927 A | 1/1995 | Richter et al. |
| 5,407,629 A | 4/1995 | Schmidt et al. |
| 5,429,702 A | 7/1995 | Grooms et al. |
| 5,433,347 A | 7/1995 | Richter et al. |
| 5,435,452 A | 7/1995 | Nishigami et al. |
| 5,447,678 A | 9/1995 | Kneer et al. |
| 5,464,106 A | 11/1995 | Slat et al. |
| 5,472,753 A | 12/1995 | Farha |
| 5,508,076 A | 4/1996 | Bright |
| 5,513,761 A | 5/1996 | Kobayashi et al. |
| 5,529,744 A | 6/1996 | Tindale |
| 5,567,377 A | 10/1996 | Nishigami et al. |
| 5,582,788 A | 12/1996 | Collette et al. |
| 5,647,930 A | 7/1997 | Bright |
| 5,688,570 A | 11/1997 | Ruttinger, Sr. |
| 5,750,216 A | 5/1998 | Horino et al. |
| 5,780,128 A | 7/1998 | Farha |
| 5,799,809 A | 9/1998 | Sako et al. |
| 5,804,016 A | 9/1998 | Schmidt et al. |
| 5,804,305 A | 9/1998 | Slat et al. |
| 5,819,978 A | 10/1998 | Hlebovy |
| 5,894,041 A | 4/1999 | Cornell |
| 5,908,124 A | 6/1999 | Klauke et al. |
| 5,921,416 A | 7/1999 | Uehara |
| 5,921,438 A | 7/1999 | Kobayashi et al. |
| 5,925,710 A | 7/1999 | Wu et al. |
| 5,927,525 A | 7/1999 | Darr et al. |
| RE36,410 E | 11/1999 | Meshberg |
| 5,989,482 A | 11/1999 | Sagawa |
| 6,034,167 A | 3/2000 | Tung et al. |
| 6,039,204 A | 3/2000 | Hosokoshiyama et al. |
| 6,066,287 A | 5/2000 | Brady et al. |
| 6,068,900 A | 5/2000 | Kohn et al. |
| 6,083,450 A | 7/2000 | Safian |
| 6,136,286 A | 10/2000 | Okuyama et al. |
| 6,195,201 B1 | 2/2001 | Koch et al. |
| 6,197,851 B1 | 3/2001 | Maxwell et al. |
| 6,198,793 B1 | 3/2001 | Schultz et al. |
| 6,205,847 B1 | 3/2001 | Nomoto |
| 6,238,201 B1 | 5/2001 | Safian |
| 6,254,820 B1 | 7/2001 | Cornell |
| 6,266,943 B1 | 7/2001 | Nomoto et al. |
| 6,276,558 B1 | 8/2001 | Kneer |
| 6,312,641 B1 | 11/2001 | Hutchinson |
| 6,332,726 B2 | 12/2001 | Yamamoto et al. |
| 6,352,426 B1 | 3/2002 | Hutchinson et al. |
| 6,359,969 B1 | 3/2002 | Shmaenok |
| H2018 H | 4/2002 | Giaimo et al. |
| 6,438,199 B1 | 8/2002 | Schultz et al. |
| 6,467,653 B1 | 10/2002 | Hamamoto et al. |
| 6,499,311 B2 | 12/2002 | Mahajan |
| 6,503,440 B2 | 1/2003 | Kuehn et al. |
| 6,503,586 B1 | 1/2003 | Wu et al. |

(56) References Cited

U.S. PATENT DOCUMENTS

| | | |
|---|---|---|
| 6,516,839 B1 | 2/2003 | Timp et al. |
| 6,521,159 B1 | 2/2003 | Rashid et al. |
| 6,570,168 B1 | 5/2003 | Schultz et al. |
| 6,581,803 B1 | 6/2003 | Yoshimoto et al. |
| 6,602,568 B2 | 8/2003 | Semersky |
| 6,641,881 B1 | 11/2003 | Darr |
| 6,645,421 B1 | 11/2003 | Sanderson et al. |
| 6,649,121 B1 | 11/2003 | Hamamoto et al. |
| 6,670,007 B1 | 12/2003 | Safian et al. |
| 6,676,883 B2 | 1/2004 | Hutchinson et al. |
| 6,722,102 B1 | 4/2004 | Pape et al. |
| 6,749,785 B2 | 6/2004 | Subramanian et al. |
| 6,933,055 B2 | 8/2005 | Share et al. |
| 6,981,617 B2 | 1/2006 | Nakamura et al. |
| 7,036,690 B2 | 5/2006 | Tsubaki et al. |
| 7,044,334 B2 | 5/2006 | Mita et al. |
| 7,055,719 B2 | 6/2006 | Nomoto et al. |
| 7,114,636 B2 | 10/2006 | Yoshimoto et al. |
| 7,188,751 B2 | 3/2007 | Van Der Klaauw et al. |
| 7,201,291 B2 | 4/2007 | Vigny et al. |
| 7,204,950 B2 | 4/2007 | Farha et al. |
| 7,253,422 B2 | 8/2007 | Smith |
| 7,277,158 B2 | 10/2007 | Dierichs |
| 7,303,387 B2 | 12/2007 | Hutchinson et al. |
| 7,459,119 B2 | 12/2008 | Ota et al. |
| 7,482,047 B1 | 1/2009 | Tremley et al. |
| 7,614,515 B2 | 11/2009 | Furusawa et al. |
| 7,816,436 B2 | 10/2010 | Harrison et al. |
| 7,837,927 B2 | 11/2010 | Morel et al. |
| 8,029,718 B2 | 10/2011 | O'Brien et al. |
| 8,118,183 B2 | 2/2012 | Iwahashi et al. |
| 9,555,572 B2 | 1/2017 | Van Hove et al. |
| 9,919,841 B2 | 3/2018 | Van Hove et al. |
| 10,668,659 B2 | 6/2020 | Van Hove et al. |
| 10,730,664 B2 | 8/2020 | Van Hove et al. |
| 10,864,671 B2 | 12/2020 | Van Hove et al. |
| 2001/0040173 A1 | 11/2001 | Yamamoto et al. |
| 2002/0022140 A1 | 2/2002 | Semersky |
| 2002/0130139 A1 | 9/2002 | Shiraishi et al. |
| 2002/0141071 A1 | 10/2002 | Singer et al. |
| 2002/0153386 A1 | 10/2002 | Uetake et al. |
| 2002/0190079 A1 | 12/2002 | Hamamoto |
| 2003/0031017 A1 | 2/2003 | Tsuji |
| 2003/0086524 A1 | 5/2003 | Schultz et al. |
| 2003/0095623 A1 | 5/2003 | Singer et al. |
| 2004/0060889 A1 | 4/2004 | Yoneyama et al. |
| 2004/0061930 A1 | 4/2004 | Wedowski |
| 2004/0069735 A1 | 4/2004 | Yoneyama et al. |
| 2004/0076782 A1 | 4/2004 | Safian et al. |
| 2004/0086703 A1 | 5/2004 | Semersky |
| 2004/0112921 A1 | 6/2004 | Nomoto et al. |
| 2004/0119961 A1 | 6/2004 | Singer et al. |
| 2004/0151937 A1 | 8/2004 | Hutchinson et al. |
| 2004/0159983 A1 | 8/2004 | Clougherty |
| 2004/0187444 A1 | 9/2004 | Hutchinson et al. |
| 2004/0217128 A1 | 11/2004 | Nakamura et al. |
| 2004/0227922 A1 | 11/2004 | Dierichs et al. |
| 2004/0239908 A1 | 12/2004 | Bleeker et al. |
| 2004/0257546 A1 | 12/2004 | Banine |
| 2005/0029337 A1 | 2/2005 | Van Handel |
| 2005/0103802 A1 | 5/2005 | Alberg |
| 2005/0115054 A1 | 6/2005 | Brandner et al. |
| 2005/0133578 A1 | 6/2005 | Farha et al. |
| 2005/0136201 A1 | 6/2005 | Farha et al. |
| 2005/0270513 A1 | 12/2005 | Dierichs et al. |
| 2005/0275818 A1 | 12/2005 | Singer |
| 2006/0006586 A1 | 1/2006 | Farha et al. |
| 2006/0054635 A1 | 3/2006 | Iwahashi et al. |
| 2006/0065992 A1 | 3/2006 | Hutchinson et al. |
| 2006/0073294 A1 | 4/2006 | Hutchinson et al. |
| 2006/0078089 A1 | 4/2006 | Masaki et al. |
| 2006/0091328 A1 | 5/2006 | Kanazawa |
| 2006/0119824 A1 | 6/2006 | Dierichs |
| 2006/0132747 A1 | 6/2006 | Singer et al. |
| 2006/0138354 A1 | 6/2006 | Bakker et al. |
| 2006/0141189 A1 | 6/2006 | Akiyama et al. |
| 2006/0160031 A1 | 7/2006 | Wurm et al. |
| 2006/0257603 A1 | 11/2006 | Shi et al. |
| 2007/0262092 A1 | 11/2007 | Tyski |
| 2007/0273853 A1 | 11/2007 | Bleeker et al. |
| 2008/0100816 A1 | 5/2008 | Mulder et al. |
| 2008/0272154 A1 | 6/2008 | Maas et al. |
| 2008/0257846 A1 | 10/2008 | Hove et al. |
| 2008/0257847 A1 | 10/2008 | Van Hove et al. |
| 2008/0258353 A1 | 10/2008 | Hutchinson et al. |
| 2008/0258356 A1 | 10/2008 | Van Hove et al. |
| 2008/0260978 A1 | 10/2008 | Van Hove et al. |
| 2009/0057347 A1 | 3/2009 | Leys et al. |
| 2009/0206524 A1 | 8/2009 | Laidler et al. |
| 2010/0239799 A1 | 9/2010 | Van Hove et al. |
| 2010/0243596 A1 | 9/2010 | Van Hove et al. |
| 2010/0252583 A1 | 10/2010 | Maas et al. |
| 2011/0149200 A1 | 6/2011 | Joo |
| 2012/0132607 A1 | 5/2012 | Landman et al. |
| 2015/0210420 A1 | 7/2015 | Hosokoshiyama |

FOREIGN PATENT DOCUMENTS

| | | |
|---|---|---|
| DE | 69632354 T2 | 5/2005 |
| EP | 0118042 A1 | 9/1984 |
| EP | 0161185 A3 | 11/1987 |
| EP | 189750 A3 | 3/1989 |
| EP | 0389191 A1 | 9/1990 |
| EP | 0346518 B1 | 2/1993 |
| EP | 0729819 A1 | 11/1996 |
| EP | 0799683 A2 | 10/1997 |
| EP | 0759399 B1 | 1/2002 |
| EP | 1048436 A4 | 3/2002 |
| EP | 1180424 B1 | 4/2004 |
| EP | 1547768 A1 | 6/2005 |
| EP | 1167223 B1 | 12/2005 |
| EP | 1671776 A1 | 6/2006 |
| EP | 1482366 A2 | 10/2007 |
| EP | 1245499 B1 | 4/2009 |
| EP | 1593605 B1 | 10/2009 |
| EP | 2245954 A1 | 11/2010 |
| EP | 1356915 B1 | 11/2011 |
| EP | 1284918 A1 | 6/2012 |
| EP | 2148770 B2 | 11/2021 |
| FR | 2138685 B1 | 7/1973 |
| FR | 2676958 A1 | 12/1992 |
| FR | 2717783 A1 | 9/1995 |
| FR | 2866010 A1 | 8/2005 |
| GB | 1329257 A | 9/1973 |
| JP | S4826027 A | 4/1973 |
| JP | S57174221 A | 10/1982 |
| JP | S60201909 A | 10/1985 |
| JP | S61185417 A | 8/1986 |
| JP | H02108516 A | 4/1990 |
| JP | H04173134 A | 6/1992 |
| JP | H04267727 A | 9/1992 |
| JP | H0531791 A | 2/1993 |
| JP | H05213373 A | 8/1993 |
| JP | H0639906 A | 2/1994 |
| JP | H06345069 A | 12/1994 |
| JP | H071564 A | 1/1995 |
| JP | H0748519 A | 2/1995 |
| JP | H081761 A | 1/1996 |
| JP | H08175568 A | 7/1996 |
| JP | H09150830 A | 6/1997 |
| JP | H09208688 A | 8/1997 |
| JP | H09308688 A | 12/1997 |
| JP | H1010719 A | 1/1998 |
| JP | H10500078 A | 1/1998 |
| JP | H10128833 A | 5/1998 |
| JP | H10180853 A | 7/1998 |
| JP | H10338269 A | 12/1998 |
| JP | H1110719 A | 1/1999 |
| JP | H1177744 A | 3/1999 |
| JP | 2000016469 A | 1/2000 |
| JP | 2000062745 A | 2/2000 |
| JP | 2001001389 A | 1/2001 |
| JP | 2001106218 A | 4/2001 |
| JP | 2001179810 A | 7/2001 |

(56) References Cited

FOREIGN PATENT DOCUMENTS

| | | |
|---|---|---|
| JP | 2002198309 A | 7/2002 |
| JP | 2002313598 A | 10/2002 |
| JP | 2004128449 A | 4/2004 |
| JP | 2004149196 A | 5/2004 |
| JP | 3556344 B2 | 8/2004 |
| JP | 2005047172 A | 2/2005 |
| JP | 2005047538 A | 2/2005 |
| JP | 2005075414 A | 3/2005 |
| JP | 2006036250 A | 2/2006 |
| JP | 2006165552 A | 6/2006 |
| JP | 2006182389 A | 7/2006 |
| JP | 3935213 B2 | 6/2007 |
| JP | 2007276790 A | 10/2007 |
| JP | 2008254774 A | 10/2008 |
| JP | 4580524 B2 | 11/2010 |
| JP | 4586223 B2 | 11/2010 |
| JP | WO2011/010719 A1 | 1/2013 |
| KR | 20070012493 A | 1/2007 |
| KR | 20070119060 A | 12/2007 |
| KR | 100859229 B1 | 9/2008 |
| KR | 100921267 B1 | 10/2009 |
| RU | 2133699 C1 | 7/1999 |
| RU | 2346871 C2 | 2/2009 |
| UA | 82470 C2 | 4/2008 |
| WO | WO1990007414 A1 | 7/1990 |
| WO | WO1990007555 A1 | 7/1990 |
| WO | WO19990003668 A1 | 1/1991 |
| WO | WO19910008099 A1 | 6/1991 |
| WO | WO19910012926 A1 | 9/1991 |
| WO | WO19920011187 A1 | 7/1992 |
| WO | WO19980013292 A1 | 4/1998 |
| WO | WO19990011561 A1 | 3/1999 |
| WO | WO1999033634 A1 | 7/1999 |
| WO | WO2000003944 A1 | 1/2000 |
| WO | WO0185420 A1 | 11/2001 |
| WO | WO20030037725 A1 | 5/2003 |
| WO | WO2004060748 A1 | 7/2004 |
| WO | WO2004106426 A1 | 7/2005 |
| WO | WO2006124199 A1 | 11/2006 |
| WO | WO2007039158 A1 | 4/2007 |
| WO | WO2006107099 A1 | 10/2008 |
| WO | WO2008129016 A1 | 10/2008 |
| WO | WO2009041809 A1 | 4/2009 |
| WO | WO2009088285 A1 | 7/2009 |
| WO | WO2009154446 A1 | 12/2009 |
| WO | WO2009074285 A1 | 3/2010 |
| WO | WO2010044659 A1 | 4/2010 |
| WO | WO2010014004 A3 | 11/2010 |
| WO | WO2014077681 A3 | 8/2014 |

OTHER PUBLICATIONS

In the High Court of Justice Business and Property Courts of England and Wales Intellectual Property List (ChD) Patents Court, Particulars of Claim, Oct. 9, 2018, 2 pages.
Wikipedia article, "Crystallization of polymers," last edited on May 18, 2018, retrieved from https://en.wikipedia.org/w/index.php?title=Crystalization_of_polymers&oldid=841776901.
International Search Report for International Application No. PCT/NL2008/050225 dated Sep. 22, 2008.
Japanese Office Action for Japanese Patent Application No. 2010-504004, mailed on Nov. 2, 2011.
John Bozzelli, What to Do About Weak Weld Lines: Plastics Technology, Apr. 1, 2008, 5 pages, https://www.ptonline.com/articles/what-to-do-about-weak-weld-lines. Heiniken Ex. 1030.
Misko, George G., The Regulation of Packaging by the Alcohol and Tobacco Tax and Trade Bureau: An Added Level of Complexity, Apr. 10, 2008, 6 pages, www.packaginglaw.com. Heiniken Ex. 1022.
Non-Final Rejection dated Jan. 26, 2017 for U.S. Appl. No. 14/552,343, now Patented.
Non-Final Rejection dated Apr. 13, 2021 for U.S. Appl. No. 16/440,744, now Abandoned.
Non-Final Rejection dated Apr. 4, 2018 for U.S. Appl. No. 14/887,189, now Abandoned.
Non-Final Rejection dated Apr. 5, 2016 for U.S. Appl. No. 14/552,365, now Abandoned.
Non-Final Rejection dated Apr. 7, 2017 for U.S. Appl. No. 14/552,426, now Patented.
Non-Final Rejection dated Aug. 7, 2019 for U.S. Appl. No. 15/919,159, now Patented.
Non-Final Rejection dated Aug. 30, 2021 for U.S. Appl. No. 16/889,566, now Abandoned.
Non-Final Rejection dated Aug. 6, 2013 for U.S. Appl. No. 12/450,895, now Patented.
Non-Final Rejection dated Dec. 19, 2019 for U.S. Appl. No. 16/582,780, now Abandoned.
Non-Final Rejection dated Dec. 22, 2021 for U.S. Appl. No. 17/115,721, now Abandoned.
Non-Final Rejection dated Dec. 2, 2013 for U.S. Appl. No. 12/450,896, now Patented.
Non-Final Rejection dated Feb. 12, 2015 for U.S. Appl. No. 12/450,893, now Patented.
Non-Final Rejection dated Feb. 3, 2010 for U.S. Appl. No. 11/785,749, now Abandoned.
Non-Final Rejection dated Feb. 4, 2014 for U.S. Appl. No. 12/450,904, now Patented.
Non-Final Rejection dated Jan. 13, 2015 for U.S. Appl. No. 12/450,892, now Patented.
Non-Final Rejection dated Jan. 25, 2017 for U.S. Appl. No. 14/552,419, now Patented.
Non-Final Rejection dated Jan. 26, 2015 for U.S. Appl. No. 12/450,895, now Patented.
Banine V. et al, "The relationship between an EUV source and the performance of an EUV lithographic system", Proceedings of SPIE, Jan. 1, 2000 IEEE, US, vol. 3997,pp. 126-135. XP002493691.
David W. Brooks and Geoff A. Giles, PET Packaging Technology, 2002, 390 pages, Scheffield Packaging Technology, Scheffield Academic Press Ltd. Heiniken Ex. 1018.
Du et al., Polymer Engineering and Science, 2010, 1111-21.
Dynamic mechanical analysis of PET, Thermal Analysis Application No. HB 238, Dec. 2009, 3 pages, Mettler-Toledo TA Application Handbook Thermoplastics. Heiniken Ex. 1037.
Fried, Joel R., Polymer Science & Technology (second edition), Prentice Hall Professional Technical Reference, 2003, 32 pages, Upper Saddle River, NJ 07458, www.phptr.com. Heiniken Ex. 1034.
Advisory Action dated Apr. 13, 2010 for U.S. Appl. No. 11/785,745, now Abandoned.
Advisory Action dated Aug. 20, 2013 for U.S. Appl. No. 12/450,896, now Patented.
Advisory Action dated Aug. 20, 2013 for U.S. Appl. No. 12/450,904, now Patented.
Advisory Action dated Dec. 1, 2014 for U.S. Appl. No. 12/450,892, now Patented.
Advisory Action dated Jul. 1, 2013 for U.S. Appl. No. 12/450,892, now Patented.
Advisory Action dated Jul. 28, 2021 for U.S. Appl. No. 15/954,556, now Abandoned.
Advisory Action dated Jun. 22, 2015 for U.S. Appl. No. 12/450,893, now Patented.
Advisory Action dated Sep. 16, 2015 for U.S. Appl. No. 12/450,895, now Patented.
Final Rejection dated May 14, 2015 for U.S. Appl. No. 12/450,892, now Patented.
Article, "Recycling," section 4.9, in "Plastics and the Environment," Anthony L. Andrady, ed., published by John Wiley & Sons, Inc., Hoboken, New Jersey, 2003, pp. 163-166.
Final Rejection dated Sep. 6, 2016 for U.S. Appl. No. 12/450,893, now Patented.
Final Rejection dated May 14, 2013 for U.S. Appl. No. 12/450,904, now Patented.
First Action Interview Office Action dated Jul. 12, 2016 for U.S. Appl. No. 15/051,610, now Patented.
Henk Albers declaration—Opposition of EP1.

(56) References Cited

OTHER PUBLICATIONS

Charles A. Harper, Handbook of Plastic Processes, 2006, 196 pages, Hoboken, New Jersey, John Wiley & Sons, Inc. Publication. Anheuser-Busch InBev Exhibit 2009.
Dutch speaking court of commerce judgement.
Ex Parte Quayle Action dated Sep. 9, 2014 for U.S. Appl. No. 12/450,904, now Patented.
Final Rejection dated May 13, 2013 for U.S. Appl. No. 12/450,896, now Patented.
Final Rejection dated Mar. 11, 2016 for U.S. Appl. No. 14/552,392, now Abandoned.
Final Rejection dated Mar. 11, 2013 for U.S. Appl. No. 12/450,895, now Patented.
Final Rejection dated Jun. 3, 2015 for U.S. Appl. No. 12/450,895, now Patented.
Final Rejection dated Jul. 26, 2013 for U.S. Appl. No. 12/450,893, now Patented.
Final Rejection dated Jul. 16, 2014 for U.S. Appl. No. 12/450,892, now Patented.
Final Rejection dated Apr. 1, 2020 for U.S. Appl. No. 15/853,597, now Patented.
Final Rejection dated Mar. 25, 2022 for U.S. Appl. No. 16/944,728 Final Rejection Mailed.
Final Rejection dated May 15, 2020 for U.S. Appl. No. 16/582,780, now Abandoned.
Final Rejection dated Oct. 20, 2021 for U.S. Appl. No. 16/440,744, now Abandoned.
Final Rejection dated Sep. 3, 2019 for U.S. Appl. No. 15/419,098, now Patented.
Final Rejection dated Apr. 11, 2017 for U.S. Appl. No. 12/450,895, now Patented.
Final Rejection dated Apr. 16, 2012 for U.S. Appl. No. 11/785,745, now Abandoned.
Final Rejection dated Apr. 21, 2015 for U.S. Appl. No. 12/450,893, now Patented.
Final Rejection dated Apr. 23, 2013 for U.S. Appl. No. 12/450,892, now Patented.
Final Rejection dated Dec. 4, 2009 for U.S. Appl. No. 11/785,745, now Abandoned.
Final Rejection dated Dec. 19, 2016 for U.S. Appl. No. 14/552,313, now Abandoned.
Final Rejection dated Feb. 2, 2021 for U.S. Appl. No. 15/954,556, now Abandoned.
Final Rejection dated Jan. 16, 2019 for U.S. Appl. No. 14/887,189, now Abandoned.
Ariel Gratch Witness Statement.
Avery, Jack, "Gas-Assist Injection Molding," chapter 1, pp. 1-29, Hanser-Gardner Publications, 2001.
Berger Kenneth R., reviewed by B. Welt, A Brief History of Packaging, (ABE321) Agricultural and Biological = Engineering Department, Florida Cooperative Extension Service, Institute of Food and Agricultural Sciences, University of Florida. Original publication, Dec. 2002, Reviewed Dec. 2005, http://edis.ifas.ufl.edu, 5 pages. Heiniken Ex. 1016.
Charles A. Harper, Handbook of Plastic Processes, 2006, 90 pages, Hoboken, New Jersey, John Wiley & Sons, Inc. Publication. Heiniken Ex. 1028.
Leaversuch, R., "Barrier PET Bottles," Plastics Technology, Mar. 2003, web: http://www.ptonline.com/articles/barrier-pet-bottles.
Ex Parte Quayle Action dated Sep. 9, 2014 for U.S. Appl. No. 12/450,896, now Patented.
Injection Molding, Blow Molding, Encyclopedia of Polymer Science and Technology, 75 pages, vols. 1 and 3, Copyright John Wiley & Sons, Inc. Anheuser-Busch InBev Exhibit 2010.
In the High Court of Justice Business and Property Courts of England and Wales Intellectual Property List (ChD) Patents Court, Ground of Invalidity (EP 770), Oct. 9, 2018, 6 pages.
Clariant, Masterbatches for Thermoplastic Polyester, accessed Nov. 7, 2019. Heiniken Ex. 1041. Date of Publication Currently Unknown According to Heiniken Prior Art Notice (ITC 337-TA-1115).

Standard PET preforms & specific developments, PET preforms, 2016, 5 pages, www.pdg-plastiques.com. Heiniken Ex. 1031. Date of Publication Currently Unknown According to Heiniken Prior Art Notice (ITC 337-TA-1115).
Online article, "Co-molding—Overmolding—Plastopia," https://www.plastopialtd.com/co-molding/, Plastopia Molding Limited 2015-2021.
Online article, "Injection Overmolding—Plastopia," https://www.plastopialtd.com/overmolding/, Plastopia Molding Limited 2015-2021.
http://www.sipa.it/en/SIPA%20turn%20key%20lines.
Bag-in-a-box (BiB)—Diffpack, Aug. 27, 2018, 7 pages, http://www_diffpack.com/bag-box-bb/. Heiniken Ex_ 1020_ Date of Publication Currently Unknown According to Heiniken Prior Art Notice (ITC 337-TA-1115).
Wiley, John & Sons, "Processing and finishing of Polymeric Materials, "vol. 2, p. 221 (2011) ISBN 978-0-470-88917-6.
Antoni M. et al, "Illumination Optics Design for EUV-Lithography", Proceedings of SPIE, Aug. 3, 2000 IEEE, US, vol. 4146,pp. 25-34, XP009008840.
Connor, M. et al., "A criterion for optimum adhesion applied to fibre reinforced composites," 32 Journal of Material Science 5059-67 (1997).
Dr. Ulrich K. Thiele, Polyester Bottle Resins, Production Processing, Properties and Recycling, 2007. 16 pages, Impressum, PETplanet print vol. 6 Heiniken Ex. 1035.
Giles, Geoff A , Handbook of Beverage Packaging, Sheffied Food Techology, 1999, 20 pages, Sheffield Academic Press Ltd. Heiniken Ex. 1019.\
Multilayered blow molded container used for carbonated beverages, comprises resin made outer and inner layers, which are separable.
Norman Lee, Plastic Blow Molding Handbook, Society of Plastic Engineers and its Blow Molding Division, 1990, 18 pages, Van Nostrand Reinhold, New York, NY. Heiniken Ex. 1032.
Nyacol Nano Technologies, Inc., Transparent IR Absorbers and Antistatic Additives, Nyacol Applications, Aug. 27, 2018, 3 pages, http://www nyacol.com/application/it—absorbers—antistatic—additives/. Heiniken Ex. 1039. Date of Publication Currently Unknown According to Heiniken Prior Art Notice (ITC-337-TA-1115).
Omnexus by SpecialChem. The Universal Selection Source: Plastics & Elastomers, Thermoplastics Polyester PET, Aug. 23, 2018, 19 pages, https://omnexus.specialchem.com/selectors/c-thermoplastics-polyester-pet. Heiniken Ex. 1036. Date of Publication Currently Unknown According to Heiniken Prior Art Notice (ITC 337-TA-1115).
Sanchez-Valdes, S. et al., Polymer Engineering and Science, Jan. 1998, No. 1, 150-55.
Non-Final Rejection dated Jan. 29, 2010 for U.S. Appl. No. 11/785,746, now Abandoned.
Non-Final Rejection dated Jan. 29, 2016 for U.S. Appl. No. 14/552,408, now Patented.
Non-Final Rejection dated Jul. 1, 2020 for U.S. Appl. No. 15/954,556, now Abandoned.
Non-Final Rejection dated Jul. 20, 2016 for U.S. Appl. No. 12/450,895, now Patented.
Non-Final Rejection dated Mar. 4, 2019 for U.S. Appl. No. 15/419,098, now Patented.
Non-Final Rejection dated Mar. 26, 2014 for U.S. Appl. No. 12/450,893, now Patented.
Non-Final Rejection dated Mar. 7, 2016 for U.S. Appl. No. 14/552,313, now Abandoned.
Non-Final Rejection dated Mar. 14, 2016 for U.S. Appl. No. 12/450,893, now Patented.
Non-Final Rejection dated Mar. 24, 2014 for U.S. Appl. No. 12/450,895, now Patented.
Non-Final Rejection dated May 27, 2009 for U.S. Appl. No. 11/785,745, now Abandoned.
Non-Final Rejection dated Nov. 28, 2012 for U.S. Appl. No. 12/450,893, now Patented.
Non-Final Rejection dated Oct. 1, 2021 for U.S. Appl. No. 16/944,728 Final Rejection Mailed.
Non-Final Rejection dated Oct. 3, 2019 for U.S. Appl. No. 15/853,597, now Patented.

(56) References Cited

OTHER PUBLICATIONS

Non-Final Rejection dated Oct. 9, 2012 for U.S. Appl. No. 12/450,895, now Patented.
Non-Final Rejection dated Oct. 10, 2012 for U.S. Appl. No. 12/450,892, now Patented.
Non-Final Rejection dated Oct. 11, 2012 for U.S. Appl. No. 12/450,904, now Patented.
Non-Final Rejection dated Sep. 6, 2011 for U.S. Appl. No. 11/785,745, now Abandoned.
Non-Final Rejection dated Sep. 18, 2015 for U.S. Appl. No. 14/552,365, now Abandoned.
Non-Final Rejection dated Sep. 19, 2012 for U.S. Appl. No. 12/450,896, now Patented.
Non-Final Rejection dated Sep. 22, 2015 for U.S. Appl. No. 14/552,408, now Patented.
Non-Final Rejection dated Sep. 25, 2013 for U.S. Appl. No. 12/450,892, now Patented.
Non-Final Rejection dated Sep. 27, 2016 for U.S. Appl. No. 12/450,895, now Patented.
Prof Meijer declaration—Opposition of EP1.
USPTO Before the Patent Trial and Appeal Board, IPR2018-01665, Petition for Inter Partes Review of U.S. Pat. No. 9,555,572, CI 9-13, 71 pp.
USPTO Before the Patent Trial and Appeal Board, IPR2018-01669, U.S. Pat. No. 9,517,876, Sep. 6, 2018, 06 pp.
USPTO Before the Patent Trial and Appeal Board, IPR2018-01667, Petition for Inter Partes Review of U.S. Pat. No. 9,555,572, CI 1 7 8 14-17, 101 pp.
USPTO Before the Patent Trial and Appeal Board, IPR2018-01663, U.S. Pat. No. 9,944,453, Sep. 6, 2018, 06 pp.
USPTO Before the Patent Trial and Appeal Board, IPR2018-01663, Petition for Inter Partes Review of U.S. Pat. No. 9,944,453, 98 pp.
USPTO Before the Patent Trial and Appeal Board, IPR2018-01669, Petition for Inter Partes Review of U.S. Pat. No. 9,517,876, 85 pp.
Requirement for Restriction/Election dated Apr. 27, 2010 for U.S. Appl. No. 11/785,750, now Abandoned.
Requirement for Restriction/Election dated Aug. 7, 2012 for U.S. Appl. No. 12/450,892, now Patented.
Requirement for Restriction/Election dated Jun. 17, 2010 for U.S. Appl. No. 11/785,748, now Abandoned.
Requirement for Restriction/Election dated May 27, 2010 for U.S. Appl. No. 11/785,747, now Abandoned.
Requirement for Restriction/Election dated May 30, 2012 for U.S. Appl. No. 12/450,896, now Patented.
Restriction Requirement dated Feb. 18, 2020 for U.S. Appl. No. 15/954,556, now Abandoned.
Restriction Requirement dated Jan. 25, 2018 for U.S. Appl. No. 14/887,189, now Abandoned.
Restriction Requirement dated Oct. 5, 2012 for U.S. Appl. No. 12/450,893, now Patented.
Richard Coles, Derek McDowell, Mark J. Kirwan, Food Packaging Technology, 2003, 262 pages, Blackwell Publishing Ltd. Heineken Ex. 1017.
USPTO Before the Patent Trial and Appeal Board, IPR2018-01665, U.S. Pat. No. 9,555,572, Sep. 6, 2018, 06 pp.
Sarah Van Hove witness statement.
Machine English translation of JP 10-180853, Apr. 2023.

INTEGRALLY BLOW-MOULDED BAG-IN-CONTAINER HAVING A BAG ANCHORING POINT, PROCESS FOR THE PRODUCTION THEREOF, AND TOOL THEREOF

FIELD OF THE INVENTION

The present invention relates in general to new developments in dispensing bag-in-containers and, in particular, to anchoring means for fixing the bag to the container at at least one point in order to stabilize it during collapse thereof upon use. It also relates to a method and tool for producing said bag-in-containers.

BACKGROUND OF THE INVENTION

Bag-in-containers, also referred to as bag-in-bottles or bag-in-boxes depending on the geometry of the outer vessel, all terms considered herein as being comprised within the meaning of the term bag-in-container, are a family of liquid dispensing packaging consisting of an outer container comprising an opening to the atmosphere—the mouth—and which contains a collapsible inner bag joined to said container and opening to the atmosphere at the region of said mouth. The system must comprise at least one vent fluidly connecting the atmosphere to the region between the inner bag and the outer container in order to control the pressure in said region to squeeze the inner bag and thus dispense the liquid contained therein.

Traditionally, bag-in-containers were—and still are—produced by independently producing an inner bag provided with a specific neck closure assembly and a structural container (usually in the form of a bottle). The bag is inserted into the fully formed bottle opening and fixed thereto by means of the neck closure assembly, which comprises one opening to the interior of the bag and vents fluidly connecting the space between bag and bottle to the atmosphere; examples of such constructions can be found inter alia in U.S. Pat. Nos. 3,484,011, 3,450,254, 4,330,066, and 4,892,230. These types of bag-in-containers have the advantage of being reusable, but they are very expensive and labour-intensive to produce.

More recent developments focused on the production of "integrally blow-moulded bag-in-containers" thus avoiding the labour-intensive step of assembling the bag into the container, by blow-moulding a polymeric multilayer preform into a container comprising an inner layer and an outer layer, such that the adhesion between the inner and the outer layers of the thus produced container is sufficiently weak to readily delaminate upon introduction of a gas at the interface. The "inner layer" and "outer layer" may each consist of a single layer or a plurality of layers, but can in any case readily be identified, at least upon delamination. Said technology involves many challenges and many alternative solutions were proposed.

The multilayer preform may be extruded or injection moulded (cf. U.S. Pat. No. 6,238,201, JPA10128833, JPA11010719, JPA9208688, U.S. Pat. No. 6,649,121. When the former method is advantageous in terms of productivity, the latter is preferable when wall thickness accuracy is required, typically in containers for dispensing beverage.

Preforms for the production of integrally blow-moulded bag-in-containers clearly differ from preforms for the production of blow-moulded co-layered containers, wherein the various layers of the container are not meant to delaminate, in the thickness of the layers. A bag-in-container is comprised of an outer structural envelope containing a flexible, collapsible bag. It follows that the outer layer of the container is substantially thicker than the inner bag. This same relationship can of course be found in the preform as well, which are characterized by an inner layer being substantially thinner than the outer layer. Moreover, in some cases, the preform already comprised vents which are never present in preforms for the production of co-layered containers (cf. EPA1356915).

The formation of the vents fluidly connecting the space or interface between bag and bottle to the atmosphere remains a critical step in integrally blow-moulded bag-in-containers and several solutions were proposed in e.g., U.S. Pat. Nos. 5,301,838, 5,407,629, JPA5213373, JPA8001761, EPA1356915, U.S. Pat. No. 6,649,121, JPA10180853. One redundant problem with integrally blow-moulded bag-in-containers is the choice of materials for the inner and outer layers which must be selected according to strict criteria of compatibility in terms of processing on the one hand and, on the other hand, of incompatibility in terms of adhesion. These criteria are sometimes difficult to fulfil in combination as illustrated below. The thermal properties of the materials of the inner and outer layers should be as close as possible for the blow-moulding step, but should differ sufficiently for the injection moulding production of an integral multilayer preform.

Beside the thermal properties, it should be ensured that the inner and outer layers form a weak interface to ensure proper delamination of the inner layer from the outer layer upon use; JP2005047172 states that the inner and outer layers should be made of "mutually non-adhesive synthetic resins."

As an interface between inner and outer layer is inevitably formed upon blow-moulding, which strength may not always be as uniform as one could desire, due to various phenomena during the blow-moulding stage, such as local heat gradients, differential resin stretch and flow rates at different points of the vessel, etc., the delamination of the inner bag from the outer layer is not always perfectly controllable. It has been observed that the two layers may delaminate preferentially on one side of the bag-in-container due to a local weakness of the interface and, as the bag starts shrinking asymmetrically bending and folding with the risk of forming pockets full of liquid separated from the container's mouth. If this happens, the bag-in-container cannot be used anymore although it can still contain a considerable amount of liquid.

JP4267727 suggests to fix the inner and outer layers at their bottoms without disclosing how to achieve this. In Japanese Utility Model JP7048519, one end of a co-extruded multilayer parison is pinched off such that mutually engaging corrugations are formed, and fixing the structure through an additional device prior to blow-moulding. U.S. Pat. No. 6,649,121 proposes to fix the inner bag to the outer layer by forming at the bottom of the inner layer of the preform to be blow-moulded into the bag-in-container, a protrusion which fits a through hole formed at the bottom of the outer layer and engages mechanically on the outer surface of the outer layer. This geometry appears to be maintained through the blow-moulding process by limiting the axial stretch of the bottom area of the container through the driving downwards of a stretching rod.

Co-extruded parisons as described in the foregoing Japanese Utility Model do not allow the same wall thickness control as when injection moulded preforms are used, which is required in applications in the field of pressurized beverage dispense bag-in-containers. The solution proposed in U.S. Pat. No. 6,649,121 applies to bag-in-containers wherein the liquid contained in the bag is dispensed by decreasing the pressure in the bag and does not allow to dispense liquid by injection of a pressurized gas at a point of the interface between the inner and outer layers because the inner layer's protrusion is not meant to engage hermetically on the outer surface of the outer layer. Indeed, the solution proposed in U.S. Pat. No. 6,649,121 includes that air must penetrate through the interstice between the protrusion and the through hole wall to compensate for the growing pressure drop as a gap is formed between the inner and outer layers upon extracting the liquid by vacuum and the resulting shrinking of the bag.

It follows from the foregoing that there remains a need in the art for an integrally blow-moulded bag-in-container that allows controlled delamination of the inner bag from the outer container upon injection of a pressurized gas at the interface thereof.

SUMMARY OF THE INVENTION

The present invention is defined in the appended independent claims. Preferred embodiments are defined in the dependent claims. In particular the present invention relates to an integrally blow-moulded bag-in-container obtainable by blow-moulding an injection moulded multi-layer preform. The bag-in-container includes an inner layer forming the bag and an outer layer forming the container, and a single opening, the mouth, fluidly connecting the volume defined by the bag to the atmosphere. The container further includes at least one interface vent fluidly connecting the interface between inner and outer layers to the atmosphere, wherein the bag is anchored to the outer layer at at least one point remote from the single opening.

It also concerns a process for producing a bag-in-container as described above comprising the following steps:
- providing a polymer preform comprising two layers;
- bringing the preform to blow-moulding temperature;
- blow-moulding the thus heated preform to form a bag-in-container;

wherein during the process, the inner bag is anchored to the outer layer at at least one point remote from the bag-in-container's mouth.

The anchoring may be realized through locally enhanced mechanical, physical, or chemical adhesion between the inner and outer layers, or combinations thereof.

Locally enhanced mechanical adhesion may be provided with a blow-moulding tool comprising for example a sump or depression in which inner and outer layers engage during the blow-moulding process and thus become interlocked.

The sump or depression may be provided in the blow-moulding tool by inserting therein a chime defining said sump or depression. When effecting the blow-moulding operation with the chime incorporated in the blow-moulding tool the interlocking between the inner and outer layers is achieved and additionally the chime is readily fixed to the container.

DETAILED DESCRIPTION OF THE INVENTION

Figure 1A:
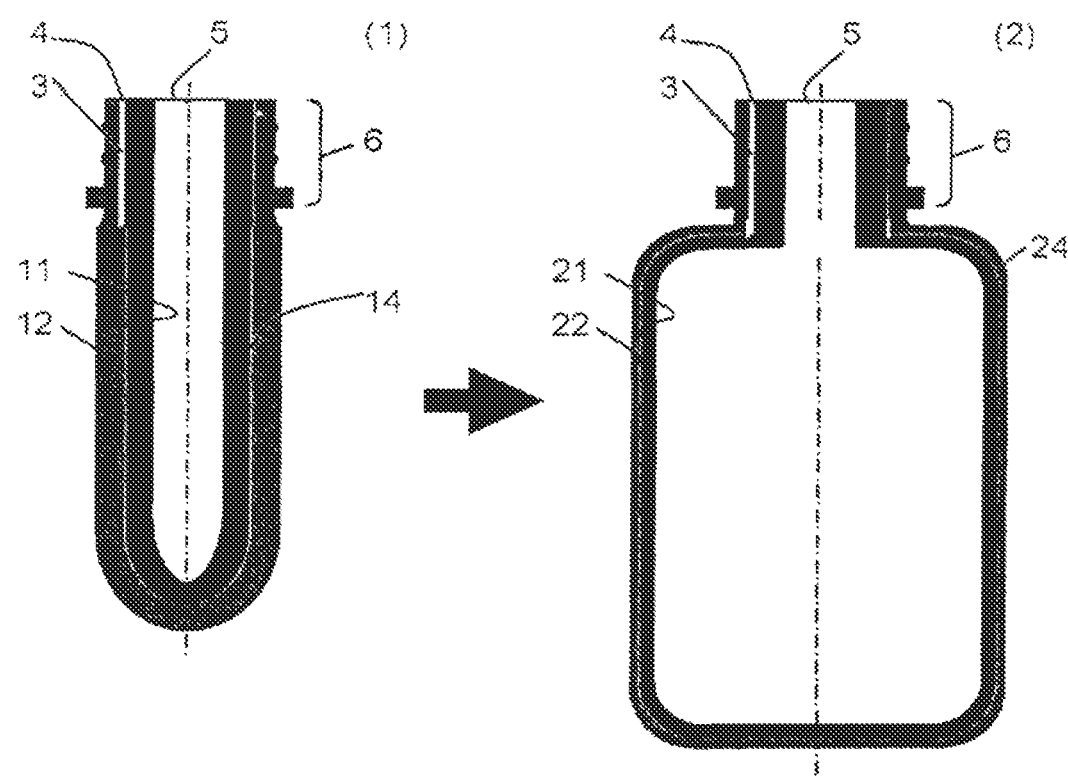
FIG. 1A is a schematic cross-sectional representation of a first embodiment of a preform according to the present invention and the bag-in-container obtained after blow-moulding thereof.
Figure 1B:
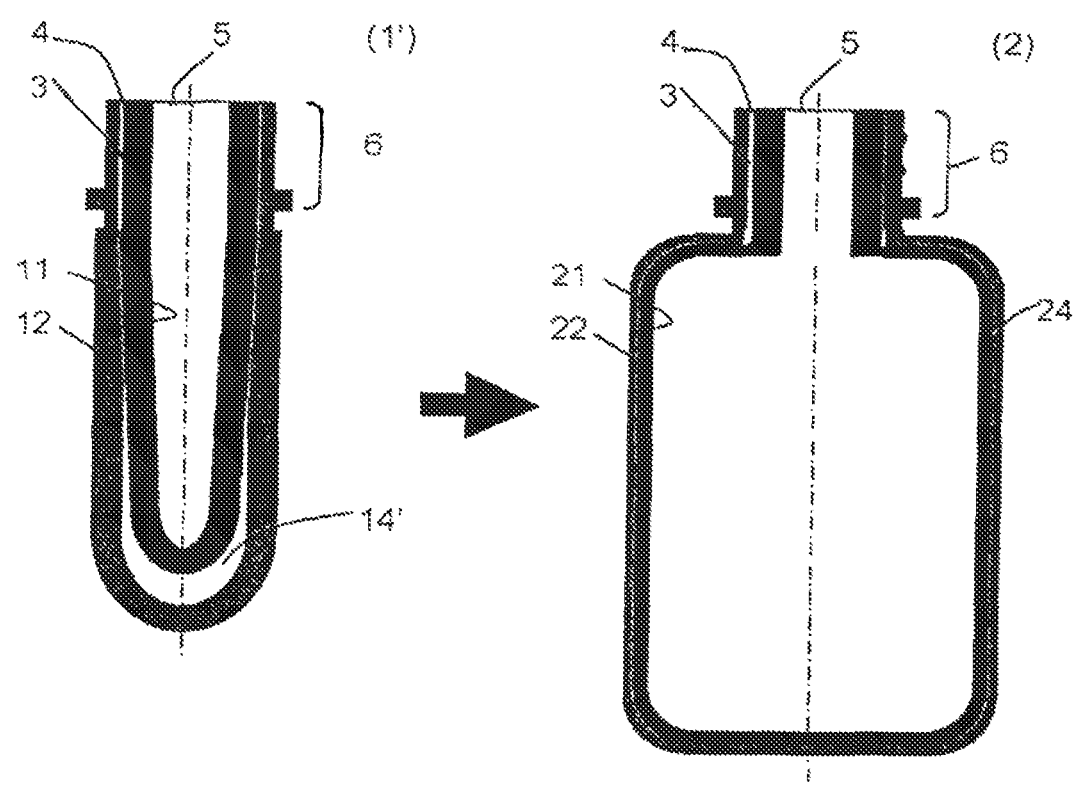
FIG. 1B: is a schematic cross-sectional representation of a second embodiment of a preform according to the present invention and the bag-in-container obtained after blow-moulding thereof.

Referring now to appended FIGS. 1A and 1B, there is illustrated an integrally blow-moulded bag-in-container (2) and a preform (1)&(1') for its manufacturing. The preform (I) comprises an inner layer (11) and an outer layer (12) joined at least at the level of the neck region (6) by an interface (shown on the right hand side). The region between inner and outer layers (11) and (12) may either consist of an interface (14) wherein the two layers are substantially contacting each other, or comprise a gap (14') in fluid communication with at least one vent (3). Said vent (3) comprises an opening to the atmosphere in (4).

Many vent geometries have been disclosed and it is not critical which geometry is selected. It is preferred, however, that the vent be located adjacent to, and oriented coaxially with said preform's mouth (5) as illustrated in FIG. 1. More preferably, the vents have the shape of a wedge with the broad side at the level of the opening (4) thereof and getting thinner as it penetrates deeper into the vessel, until the two layers meet to form an interface (14) at least at the level of the neck region. This geometry allows for a more efficient and reproducible delamination of the inner bag upon use of the bag-in-container. The container may comprise one or several vents evenly distributed around the lip of the bag-in-container's mouth. Several vents are advantageous as they permit the interface of the inner and outer layers (21) and (22) of the bag-in-container (2) to release more evenly upon blowing pressurized gas through said vents. Preferably, the preform comprises two vents opening at the vessel's mouth lip at diametrically opposed positions. More preferably, three, and most preferably, at least four vents open at regular intervals of the mouth lip.

The preform may consists of an assembly of two independent injection moulded preforms (11) and (12) produced independently from one another and thereafter assembled such that the inner preform (11) fits into the outer preform (12). This solution allows for greater freedom in the design of the neck and vents, as well as in the choice of materials constituting each preform component. Alternatively, it can be an integral preform obtained by injection moulding one layer on top of the other. The latter embodiment is advantageous over the assembled preform in that it comprises no assembly step and one production station only is required for the preform fabrication. On the other hand, the design of the vents in particular is restricted and the respective melting temperatures of the inner and outer layers must be carefully matched depending on which layer is injected first; the rule of thumb being that the layer being injected first generally requires a higher melting temperature.

The inner and outer layers of the preform (1) may consist of different materials or the same material. In case different materials are used, some requirements must be fulfilled depending on the process parameters in the injection moulding of the preform as well as in the blow-moulding of the bag-in-container. It is important of course that both materials may be processed in a rather similar process window and that they will not form too strong an interface which would not satisfactorily release upon injecting pressurized gas at the interface.

Alternatively and surprisingly, good results can be obtained also with preforms wherein both inner and outer layers consist of the same material. Particularly in case of integral, over-moulded preforms, it is generally believed that better results are obtained with semi-crystalline polymers.

The same polymer is considered in contact on either side of the interface between the inner and outer layers in the following cases:
- inner and outer layers consist of the same material (e.g., $PET_{inner}PET_{outer}$, regardless of the specific grade of each PET); or
- the inner and outer layers consist of a blend or copolymer having at least one polymer in common, provided said polymer in common is at the interface, whilst the differing polymer is substantially absent of said interface (e.g., $(0.85\ PET+0.15\ PA6)_{inner}(0.8\ PET+0.2\ PE)_{outer}$.

The presence in a layer of low amounts of additives is not regarded as rendering the material different, so far as they do not alter the interface substantially.

Preferred materials for the preform and bag-in-container of the present invention are polyesters like PET, PEN, PTT, PTN; polyamides like PA6, PA66, PA11, PA12; polyolefins like PE, PP; EVOH; biodegradable polymers like polyglycol acetate (PGAc), Polylactic acid (PLA); and copolymers and blends thereof. In case different materials are used for the inner and outer layers, their optimal blow-moulding temperature should not differ from one another by more than 70° C., preferably 40° C., most preferably 10° C., and ideally should have the same blow-moulding temperature.

The two layers (11) and (12) of the preform may be connected by an interface (14) throughout substantially the whole inner surface of the outer layer. Inversely, they may be separated over a substantial area of the preform's body by a gap (14) containing air and which is in fluid communication with at least one interface vent (3). The latter embodiment is easier to realize when using a preform assembly designed such that the inner preform is firmly fixed to the outer preform at the neck region (6) and a substantial gap (14) may thus be formed between inner and outer layers (11) and (12).

The bag-in-container (2) of the present invention is obtained by providing a preform as described above; bringing the inner and outer layers of said preform to blow-moulding temperature; fixing the thus heated preform at the level of the neck region with fixing means in the blow-moulding tool; and blow-moulding the thus heated preform to form a bag-in-container, such that the inner layer is locally anchored to the outer layer at a location (7) remote from the bag-in-container's neck region.

The inner and outer layers (21) and (22) of the thus obtained bag-in-container are connected to one another by an interface (24) over substantially the whole of the inner surface of the outer layer. Said interface (24) is in fluid communication with the atmosphere through the vents (3), which maintained their original geometry through the blow-moulding process since the neck region of the preform where the vents are located is held firm by the fixing means and is not stretched during blowing.

It is essential that the interface (24) between inner and outer layers (21) and (22) releases upon blowing pressurized gas through the vents in a consistent and reproducible manner. The success of said operation depends on a number of parameters, in particular, on the interfacial adhesive strength, the number, geometry, and distribution of the vents, the pressure of the gas injected, and the inner bag stability. The latter can be substantially improved by fixing the inner layer to the outer layer at a location remote from the neck region and mouth of the bag-in-container, such that the interface between inner and outer layers will not release at said anchoring point upon injecting pressurized gas at a point of the interface. The bag is thus fixed at two points remote from one another: the neck region and the anchoring point. This allows to better control the collapse of the bag, which is essential for a reliable and reproducible operation of the bag-in-container.

The anchoring of the inner to the outer layers may be provided by a locally enhanced mechanical, physical, or physical adhesion. Mechanical adhesion includes any interaction between inner and outer layers at all scales spanning from macroscopic mechanical interlocking to cross-crystallinity as well as molecular inter-diffusion across the interface, all phenomena well known to the person skilled in the art. Physical and chemical adhesion is also well studied and involves dispersive forces (e.g., London and Keaton forces), acid base interactions (sometimes also referred to as polar forces), hydrogen bonds, and covalent bonds.

All, but macroscopic interlocking, of the above adhesion mechanisms are temperature dependent and may be locally promoted, e.g., by controlling the local temperature of the interface at the point where anchoring is desired. In case of preform assemblies, an adhesive may be applied at the desired anchoring point prior to fitting the inner preform into the outer one. The adhesive must resist the blow-moulding temperature and be compliant enough to stretch with the preform upon blowing.

Macroscopic interlocking may be achieved by using a blow-moulding tool comprising a sump or depression at the desired anchoring point, preferably at the bottom of the container as illustrated in FIG. 1. Upon blow-moulding the heated preform expands and the inner and outer layers engage into the sump. The angle, α, formed by the sump wall with the surrounding container's body wall maybe greater to or equal to 90 degrees, in which case an anchoring point is formed by enhanced friction between the inner and outer layer at the level of the thus produced protrusion or, alternatively, the angle can be smaller than 90 degrees, in which case a mechanical interlocking of the two layers is formed like a rivet.

Preferably a stretching rod drives the preform downwards during the blow-moulding process to promote longitudinal stretching and to ensure that good contact of the preform with the tool's wall is effected at the desired point of anchoring.

In the case the angle, α, formed by the sump wall with the surrounding container's body wall is smaller than 90 degrees and the mechanical interlocking of the two layers is formed like a rivet, the anchoring point comprises an undercut. The creation of this undercut can be achieved in several methods, some of which are described below.

According to a first method, the undercut is created by using a blow-moulding tool comprising two half-moulds that are only partially closed at the location of the sump, the side walls of the half-moulds at the sump location defining a negative of the anchoring point to be created. The preform is driven down in the sump by means of a stretching rod, where after both half-moulds are moved towards each other to entirely close the mould, creating the undercut.

According to another method, a blow-moulding tool is used comprising axially moving pins that can be introduced in the mould cavity during blow-moulding, allowing creation of the undercut.

According to yet another method, the blow-moulding tool with half-moulds defining a sump negative to the anchoring point to be created. The preform being driven into the sump by means of the fluid pressure applied during blow-moulding thereof. In this method, a stretching rod may be used that either stops at a position distant from the sump or that extends into the sump. In the last case, it is preferred to use a stretching rod provided with a central fluid channel and lateral openings at its distal end (the end extending in the blow-moulding tool) that extends into the sump during stretching, such that part of the fluid used to stretch the preform is guided through the fluid channel and the lateral openings to facilitate stretching of the preform into the sump and against the inner wall the mould cavity defining the sump.

Figure 2:
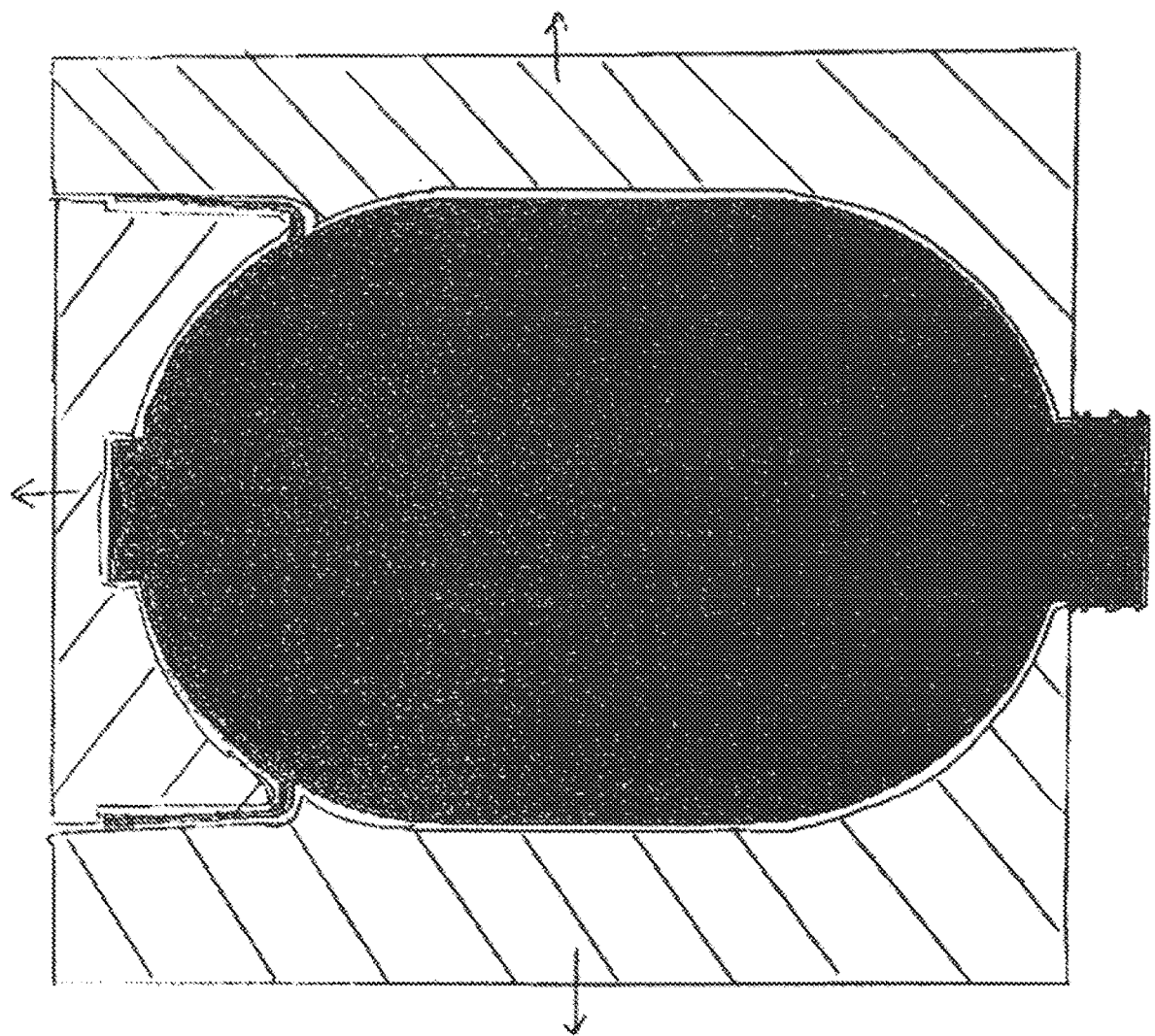
FIG. 2: is a schematic representation of a blow-moulding tool with a bag-in-container therein.

FIG. 2 schematically represents a blow-moulding tool with provided therein a chime comprising said sump or depression at the desired anchoring point. This chime is inserted in the blow-moulding tool prior to blow-moulding the preform, such that upon blow moulding the heated preform expands and the inner and outer layers engage into the sump. In this manner, the desired macroscopic interlocking is achieved and additionally a chime is provided on the container. In the case the sump defined by the chime is designed for the creation of an anchoring point in the form of a rivet, the anchoring point can successfully be created by means of fluid pressure forcing the material of the preform into the sump. Both methods applying a stretching rod and not applying a stretching rod can be used.

A release agent may be applied at the interface on either or both surfaces of the inner and outer layer, which are to form the interface of the bag-in-container. In the case the outer layer is injection moulded onto the inner layer, the release agent can be applied at the outer surface of the inner layer prior to moulding the outer layer. Any release agents available on the market and best adapted to the material used for the preform and resisting the blowing temperatures, like silicon- or PTFE-based release agents (e.g., Freekote) may be used. The release agent may be applied just prior to loading the preforms into the blowmoulding unit, or the preforms may be supplied pretreated.

The application of a release agent is particularly beneficial with respect to the design of the inner layer. Indeed, lowering the interferential adhesive strength facilitates delamination of the inner layer from the outer layer and hence reduces stress exerted on the inner layer upon delamination, as such the inner layer can be designed very thin and flexible without risking that the inner layer is damaged upon delamination. Clearly, the flexibility of the inner bag is a key parameter for the liquid dispensing and moreover costs savings can be achieved in terms on material savings when the inner layer can be designed very thin.

We claim:

1. A preform assembly for blow-molding a dispensing bag-in-container, said preform assembly comprising:
    an inner layer defined by an inner preform, the inner layer defining a volume;
    an outer layer defined by an outer preform, the inner layer and the outer layer being joined at a neck region by an interface;
    a mouth, defined by the neck region, in fluid communication with the volume; and
    an interface vent fluidly connecting the interface to atmosphere;
    wherein the inner preform is fitted into the outer preform; and
    wherein the inner layer is anchored to the outer layer at at least one anchor point remote from the neck region.

2. The preform assembly according to claim 1, wherein the anchor point is obtained by locally enhanced mechanical adhesion between the inner and outer layers.

3. The preform assembly according to claim 2, wherein mechanical adhesion is locally enhanced by a protrusion formed by both inner and outer layers.

4. The preform assembly according to claim 1, wherein the anchor point is provided by adhesive which interconnects the inner and outer layers.

5. The preform assembly according to claim 4, wherein the adhesive interconnects the inner and outer layers at the anchor point upon the inner preform being fitted into the outer preform.

6. The preform assembly according to claim 1, wherein the inner and outer layers are different materials.

7. The preform assembly according to claim 1, wherein the inner and outer layers are the same material.

8. The preform assembly according to claim 1, wherein the interface vent is in the shape of a wedge with a largest cross-sectional area at the mouth and a smallest cross-sectional area at the interface where the inner and outer layers meet.

9. The preform assembly according to claim 1, wherein the interface vent is one of a plurality of interface vents.

10. The preform assembly according to claim 9, wherein the plurality of interface vents are distributed around a lip of the mouth.

11. The preform assembly according to claim 1, wherein the inner layer and the outer layer are connected by the interface throughout substantially an entire inner surface of the outer layer.

12. The preform assembly according to claim 1, wherein the inner layer and the outer layer are separated over a substantial area of a body of the preforms by a gap in fluid communication with the interface vent.

13. The preform assembly according to claim 1, wherein the interface vent is located adjacent to, and coaxially with, the mouth.

14. The preform assembly according to claim 1, wherein each of the inner preform and the outer preform is injection moulded prior to the inner preform being fitted into the outer preform.

15. The preform assembly according to claim 1, wherein the inner layer is anchored to the outer layer, at the anchor point, as the inner preform is fitted into the outer preform.

* * * * *